US009953382B2

(12) United States Patent
Robinson

(10) Patent No.: US 9,953,382 B2
(45) Date of Patent: Apr. 24, 2018

(54) DYNAMIC DETERMINATION OF FILTERS FOR FLIGHT SEARCH RESULTS

(71) Applicant: Google Inc., Mountain View, CA (US)

(72) Inventor: Hugh Michael Robinson, Cambridge, MA (US)

(73) Assignee: GOOGLE LLC, Mountain View, CA (US)

( * ) Notice: Subject to any disclaimer, the term of this patent is extended or adjusted under 35 U.S.C. 154(b) by 295 days.

(21) Appl. No.: 14/519,918

(22) Filed: Oct. 21, 2014

(65) Prior Publication Data

US 2016/0110441 A1 Apr. 21, 2016

(51) Int. Cl.
*G06F 17/30* (2006.01)
*G06Q 50/14* (2012.01)

(52) U.S. Cl.
CPC ....... *G06Q 50/14* (2013.01); *G06F 17/30598* (2013.01)

(58) Field of Classification Search
CPC .......................... G06Q 50/14; G06F 17/30598
See application file for complete search history.

(56) References Cited

U.S. PATENT DOCUMENTS

| | | | |
|---|---|---|---|
| 5,021,953 A | 6/1991 | Webber et al. | |
| 8,442,874 B2 | 5/2013 | Moorhead | |
| 2002/0133381 A1* | 9/2002 | Tso | G06Q 10/02 705/5 |
| 2004/0042665 A1* | 3/2004 | Il | G06K 9/6218 382/225 |
| 2005/0033616 A1 | 2/2005 | Vavul et al. | |
| 2005/0043974 A1 | 2/2005 | Vassilev et al. | |
| 2007/0112606 A1* | 5/2007 | Deljo | G06Q 10/02 705/5 |
| 2008/0133526 A1* | 6/2008 | Haitani | G06F 17/30265 |
| 2008/0140464 A1 | 6/2008 | de Marcken | |
| 2009/0157664 A1* | 6/2009 | Wen | G06Q 10/047 |
| 2010/0131553 A1 | 5/2010 | Chaumont et al. | |
| 2010/0312726 A1* | 12/2010 | Thompson | G06N 99/005 706/12 |
| 2011/0231350 A1* | 9/2011 | Momma | G06F 17/30943 706/12 |
| 2012/0123909 A1 | 5/2012 | Kamenov et al. | |
| 2014/0052714 A1 | 2/2014 | Brodziak et al. | |

* cited by examiner

*Primary Examiner* — Jorge A Casanova
(74) *Attorney, Agent, or Firm* — Johnson, Marcou & Isaacs, LLC

(57) ABSTRACT

Methods, systems, and apparatus, including computer programs encoded on a computer storage medium, for providing travel itinerary filters. In one aspect, a method includes receiving a flight query including a plurality of parameters; determining a plurality of itineraries that satisfy the parameters of the flight query; clustering the plurality of itineraries into a plurality of clusters, wherein the clusters depend upon values of particular features of the plurality of itineraries that satisfy the flight query, and wherein each cluster is generated to have particular values for one or more features of a plurality of features; generating one or more filters corresponding to one or more of the clusters, wherein each filter has the particular values of the one or more features identified by the corresponding cluster; and providing the plurality of itineraries that satisfy the flight query and the one or more filters for filtering the plurality of itineraries.

20 Claims, 4 Drawing Sheets

US 9,953,382 B2

DYNAMIC DETERMINATION OF FILTERS FOR FLIGHT SEARCH RESULTS

BACKGROUND

This specification relates to information retrieval.

Conventional online travel booking sites allow users to identify and purchase travel according to a specified itinerary. For example, a user may use a flight search tool to view flight itineraries that match flight search parameters such as origin location, destination location, and travel dates. The user can select and purchase a flight itinerary that best matches the user's preferences. Typically, following the purchase of a particular flight itinerary, the user will follow the flight itinerary and complete the trip.

SUMMARY

This specification describes technologies relating to providing filters for travel itineraries.

In general, one innovative aspect of the subject matter described in this specification can be embodied in methods that include the actions of receiving a flight search query, the flight search query including a plurality of parameters; determining a plurality of itineraries that satisfy the parameters of the flight search query; clustering the plurality of itineraries into a plurality of clusters, wherein the clusters depend upon values of particular features of the plurality of itineraries that satisfy the flight search query, and wherein each cluster is generated to have particular values for one or more features of a plurality of features; generating one or more filters corresponding to one or more of the clusters, wherein each filter has the particular values of the one or more features identified by the corresponding cluster; and providing, for presentation on a user device, the plurality of itineraries that satisfy the flight search query and the one or more filters for filtering the plurality of itineraries. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Each itinerary of the plurality of itineraries is a member of at least one cluster. The particular values of the one or more features of each cluster have an associated weight. Each cluster has an associated quality score. Generating the one or more filters using the clusters includes selecting one or more clusters having a highest associated quality score. The clustering includes assigning a feature vector to each itinerary and clustering based on the feature vectors. The flight search query includes values for origin location, destination location, and date parameters. The one or more features include one or more of price, duration, number-of stops, airline, or departure time. The method further includes receiving input from the user device indicating a selection of one or more filters; and re-clustering the itineraries of the plurality of itineraries that satisfy the selected filters.

Particular embodiments of the subject matter described in this specification can be implemented so as to realize one or more of the following advantages. A set of dynamic filters can be automatically presented to a flight search user. Dynamic flight search filters can allow the user to see meaningful division points between a large number of flight search results. The filters are tailored to the specific flight search to provide filters that are helpful for the particular context of the search. The user is able to determine particular features about the available flight itineraries by viewing the presented filters. The generated filters having one or more specific parameters allow a user to more quickly identify appropriate flights without applying a number of standard filters to the available flight itineraries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A user can submit a flight search query to a travel system. The flight search query can include, particular search parameters such as origin location, destination location, departure date, and return date. The travel system can identify a set of flight itineraries that satisfy the received search parameters. The travel system can cluster the identified itineraries into a set of clusters, with the itineraries in a given cluster having values for one or more itinerary features, such as price, duration, number of stops, or carrier that are the same or within a specified range. One or more filters can be generated using the clusters and the identified itineraries and the generated filters can be provided to a user device of the user for display, e.g., in a travel search interface. The user can use the filters to filter the itineraries responsive to the flight search query. The filters can indicate groupings of itineraries that may be meaningful to the user and that may otherwise not be obvious to the user.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
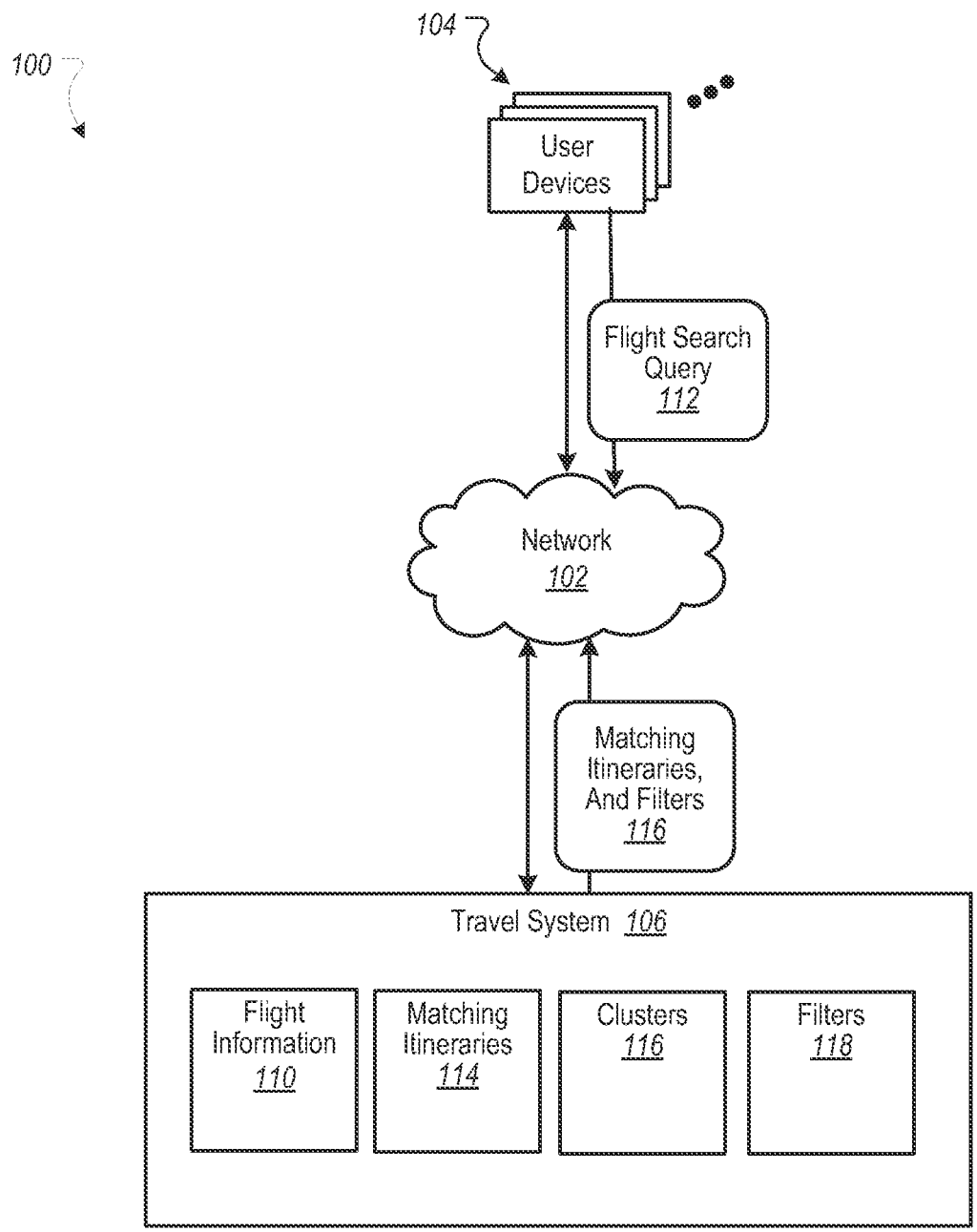
FIG. 1 is a block diagram of an example environment for providing filters for filtering flight itineraries.

FIG. 1 is a block diagram of an example environment 100 for providing filters for filtering flight itineraries. The example environment 100 includes a network 102, such as a local area network (LAN), a wide area network (WAN), the Internet, or a combination thereof. The network 102 connects user devices 104 to a travel system 106. The example environment 100 may include many user devices 104, which can each be associated with one or more users.

A user device 104 is an electronic device that is under control of a user and is capable of requesting and receiving resources over the network 102. Example user devices 104 include personal computers, tablet computers, mobile communication devices (e.g., smartphones), televisions, set top boxes, personal digital assistants and other suitable devices that can send and receive data over the network 102. A user device 104 typically includes one or more user applications, such as a web browser, to facilitate the sending and receiving of data over the network 102. A user of a user device 104 can, for example, use a web browser to search for a particular travel itinerary, including a flight itinerary.

The travel system 106 can receive a flight search query 112 from a user device 104. The flight search query 112 can include one or more parameters, such as values for origin location, destination location, and date parameters. In some implementations, the flight search query 112 is input to a flight search interface that includes respective fields for inputting parameter values. In some other implementations, the flight search query 112 is a free text query to a search field that includes values for the one or more parameters. The origin and destination locations can identify cities or particular airports.

The travel system 106 can query flight information 110 to determine a plurality of matching itineraries 114 that satisfy the parameters of the flight search query 112. The flight information 110 can be, for example, flight information received from a cache of flight information that is periodically updated, flight information received from each carrier, or flight information received as aggregated from carriers by another system.

The travel system 106 can provide the matching itineraries 114 to the user device with a set of standard filters that the user can selectively enable/disable. Enabling a filter can result in reducing a presented list of itineraries by removing all itineraries which don't satisfy the filter condition. For example, enabling a "Carrier A" filter can result in the removing of all itineraries that are not on "Carrier A". As another example, enabling a "nonstop" filter can result in the removing of all itineraries which involve stopping at an intermediate airport. Standard filters can include filtering by airline, price, flight duration, nonstop, or number of stops, to name a few examples. A user may be able to provide input individually selecting one or more of the filters.

The matching itineraries 114 can include, for example, hundreds (or more) of flight itineraries. Using standard filters to narrow down the matching itineraries into a manageable set so as to select an itinerary that most satisfies the user can be a long trial-and-error process. The user may not be able to determine which standard filters will conveniently or meaningfully divide up the matching itineraries 114. Desirable itineraries, including perhaps a best flight itinerary for the user, can be easily and mistakenly excluded by the application of a standard filter. Also, a user may not know how to best articulate their preferences using standard filters, or may not have the patience for trial-and-error standard filter experimentation.

As an alternative or an addition to standard filters, the travel system 106 can create and provide a set of filters that are generated based off a clustering of the matching itineraries 114. That is, instead of or in addition to presenting a set of standard filters that are common to each flight search, machine learning/optimization techniques can be used to automatically select and present a small set of pre-configured filters that may be the most useful in the context of the flight search query 112 for dividing the matching itineraries 114. The matching itineraries 114 can be described, for example, as a disjunction of clusters where each cluster has particular values for one or more features, such as price, duration, number-of stops, airline, or departure time. The set of clusters can summarize the matching itineraries 114 to the user so that the user can quickly view itinerary information for making an informed selection, knowing that they have found the best itinerary and have not accidentally overlooked or filtered out the best itinerary.

The travel system 106 clusters the matching itineraries 114 into a plurality of clusters 116. Each cluster of the clusters 116 has particular values for one or more features of a plurality of features. Features can include, for example, price, duration, number-of stops, airline, or departure time. An example cluster can represent "flights on carrier A that are less than $500, have at most one stop, and are less than four hours". The clusters 116 can be generated so that each itinerary of the matching itineraries 114 is a member of at least one cluster of the clusters 116.

The travel system 106 can generate one or more filters 118 using the clusters 116. For example, a filter can be created for each of the clusters 116 that filters based on the values of the one or more features of the cluster. Each of the filters 118, for example, can have associated presentation text (e.g., "flights on carrier A that are less than $500, have at most one stop, and are less than four hours", as described above). Each of the filters 118 can have or can be associated with a set of logical expressions or conditions that can be applied to the matching itineraries 114 to produce a subset of itineraries that match the filter.

The matching itineraries 114 that satisfy the flight search query 112 and the filters 118 can be provided to the user device 104, for presentation on a display of the user device 104. For example, the itineraries 114 can be presented in an itinerary list in a travel search interface. The presentation text of some or all of the filters 118 can be presented, for example, adjacent to the itinerary list. The filters can be configured to be selected in response to a selection input, e.g., from a user. For example, the user can select the presentation text of a respective filter to filter the itinerary list. In response to a selection input, the presented itineraries can be modified to show a subset of the itineraries 114 that match the selected filter. The user can select, for example, an itinerary presented in the subsetted itinerary list to view more information about the itinerary, obtain information on purchasing the itinerary through a booking provider, etc.

Figure 2:
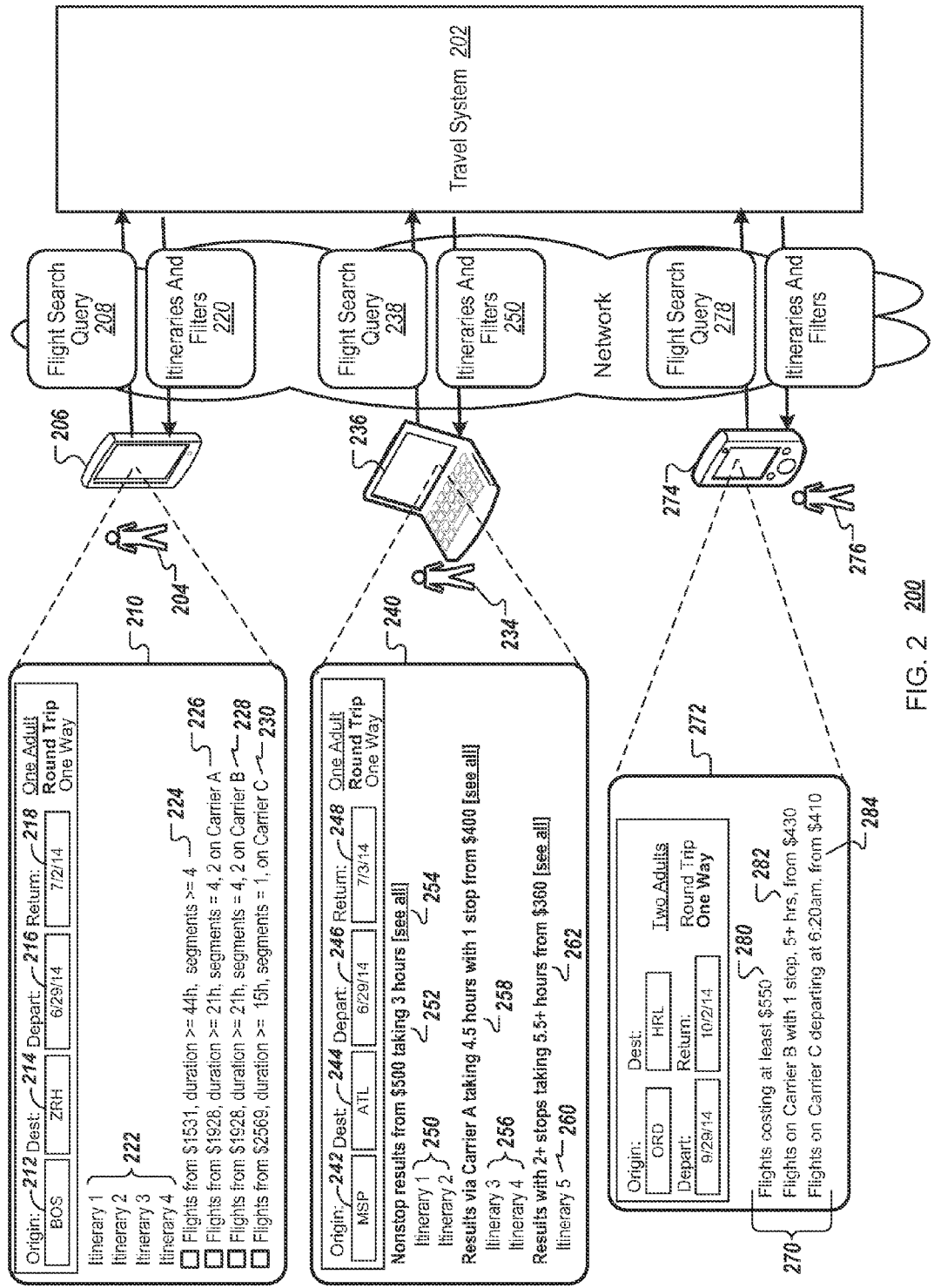
FIG. 2 is a block diagram of an example environment that includes a travel system.

FIG. 2 is a block diagram of an example environment 200 that includes a travel system 202. A user 204 uses a user device 206 to submit a flight search query 208 to the travel system 202. For example, the user 204 can use a search interface 210 to configure search parameters included in the flight search query 208 of an origin destination of BOS, a destination location of ZRH, a departure date of Jun. 29, 2014, and a return date of Jul. 2, 2014, using user interface controls 212, 214, 216, and 218, respectively.

The travel system 202 can determine a set of itineraries that match the search parameters included in the flight search query 208. The travel system 202 can cluster the itineraries into a set of clusters, with each cluster having particular values for one or more features such as price, duration, or number of stops, to name a few examples. The travel system 202 can generate one or more filters using the clusters and can provide the itineraries and generated filters (e.g., as illustrated by itineraries and filters 220) to the user device 206.

The itineraries can be shown, for example, in an itinerary list 222. In some implementations, a specified number of itineraries are displayed (e.g., five) in the travel search interface 210. In some implementations, the number of itineraries that are displayed is based on available display space in the travel search interface 210. In some implementations, the user 204 can scroll to see itineraries other than those initially visible.

The filters provided to the user device 206 can be presented in the search interface 210. For example, the search interface 210 includes filters 224, 226, 228, and 230. The user 204 can select one or more filters 224-230 to cause the itinerary list 222 to show only itineraries that match the selected filter(s). For example, the user 204 can select the filter 224 to see flight itineraries that cost as little as $1531, are at least forty four hours, and have at least four segments. As another example, the user 204 can select the filter 226 to view flight itineraries that cost as little as $1928, are as short as twenty one hours, and have four segments, two of which are on Carrier A. The user 204 can select the filter 228 to view flight itineraries that cost as little as $1928, are as short as twenty one hours, and have four segments, two of which are on Carrier B. The user 204 can select the filter 230 to view flight itineraries that cost as little as $2569, are as short as fifteen hours, and have one segment on Carrier C. The travel search interface 210 can optionally include other filters such as the standard filters described above with respect to FIG. 1.

As another example, a user 234 uses a user device 236 to submit a flight search query 238 to the travel system 202. For example, the user 234 can use a search interface 240 to configure search parameters included in the flight search query 238 of an origin destination of MSP, a destination location of ATL, a departure date of Jun. 29, 2014, and a return date of Jul. 3, 2014, using user interface controls 242, 244, 246, and 248, respectively. The travel system 202 can determine a set of itineraries that match the search parameters included in the flight search query 238, cluster the itineraries into a set of one or more clusters, generate one or more filters using the clusters and provide the itineraries and filters (e.g., as illustrated by itineraries and filters 250) to the user device 236.

In some implementations and as shown in the search interface 240, a filter can be displayed along with a list of itineraries that match the filter. For example, an itinerary list 250 is displayed underneath a filter 252. The filter 252 is associated with flight itineraries that include nonstop flights from $500 that have a duration of three hours. The itinerary list 250 can include a subset of flight itineraries that match the filter 252. A "see all" link 254 can be selected to view all of the itineraries that match the filter 252.

Other examples include an itinerary list 256 displayed underneath a filter 258 and an itinerary 260 displayed underneath a filter 262. The filter 258 is associated with flight itineraries on Carrier A, with a duration of 4.5 hours, with one stop, and costing from $400. The filter 262 is associated with flight itineraries having two or more stops, lasting at least 5.5 hours, costing from $360.

In some implementations, such as on displays of mobile devices, a filter list can be displayed without initially displaying any matching itineraries. The user can select a filter in the filter list to view itineraries that match the selected filter. For example, a filter list 270 is displayed in a search interface 272 on a user device 274 of a user 276 in response to a flight search query 278. The filter list 270 includes a filter 280 representing flights costing at least $550, a filter 282 representing flights on Carrier B with one stop, lasting at least 5.5 hours and costing from $430, and a filter 284 representing flights on Carrier C that depart at 6:20 am and cost from $410. The user 276 can select a filter 280, 282, or 284 to view flight itineraries associated with the selected filter. The filter list 270 concisely displays the choices that the user 276 has regarding selecting a flight itinerary. The user 276 may, for example, have to either pay at least $550, take a non-direct flight, or take an early flight (e.g., at 6:20 am).

Figure 3:
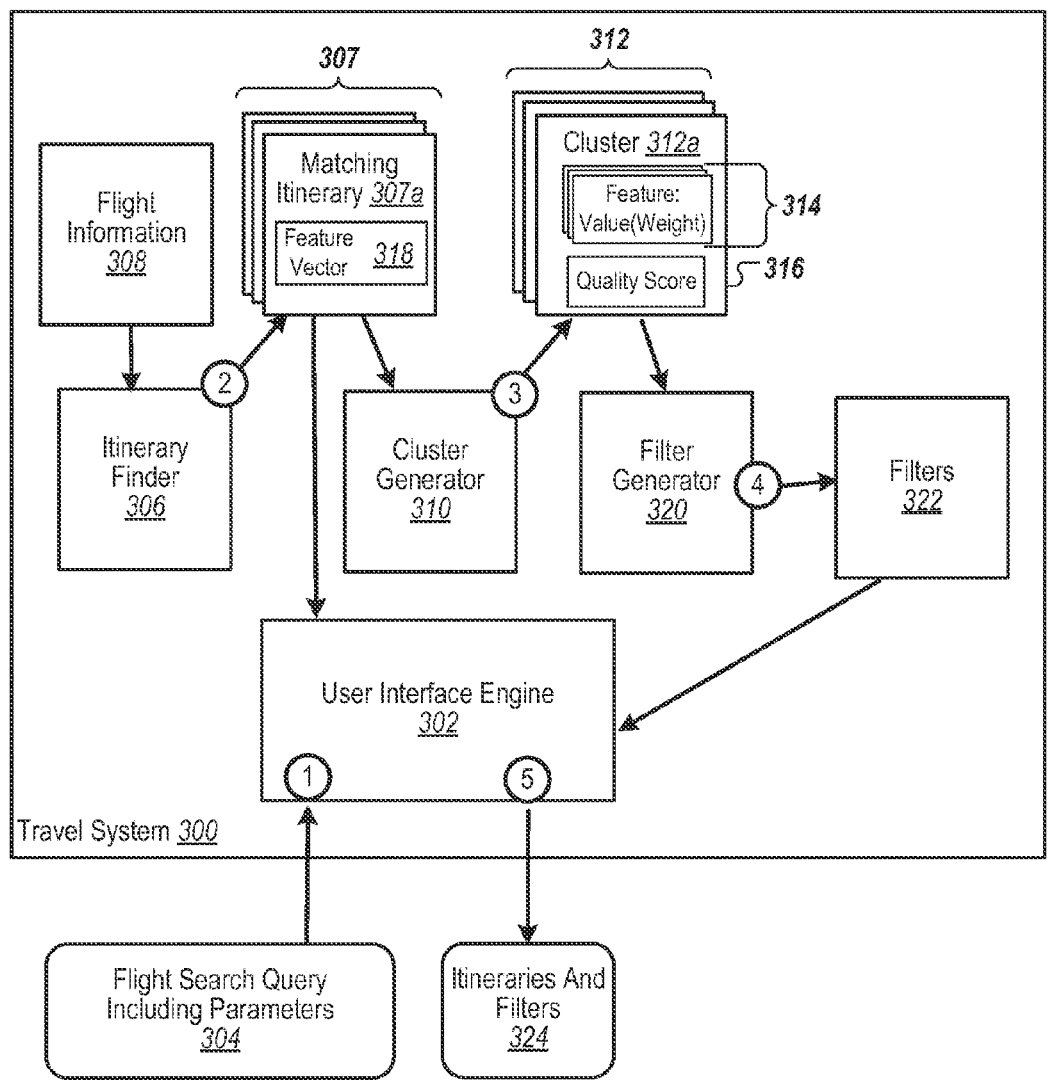
FIG. 3 is a block diagram of an example travel system.

FIG. 3 is a block diagram of an example travel system 300. In stage 1, a user interface engine 302 receives a flight search query 304 (e.g., from a user device). The flight search query 304 includes values for one or more parameters, such as values for an origin location, a destination location, and date parameters.

In stage 2, an itinerary finder 306 determines a plurality of itineraries 307 that satisfy the parameters of the flight search query 304. The itinerary finder 306 can, for example, query flight information 308. The flight information 308 can be, for example, flight information received from a cache of flight information that is periodically updated, flight information received from each carrier, or flight information received as aggregated from carriers by another system.

In stage 3, a cluster generator 310 clusters the itineraries 307 into a set of clusters 312. Each of the clusters 312 (e.g., including a cluster 312a) has particular values for one or more features of a collection of features. For instance, the cluster 312a has a collection 314 of feature/value pairs. Features can include, for example, one or more of price, duration, number-of stops, airline, or departure time. In some implementations, some or all of the values in the collection 314 of feature/value pairs have an associated weight. As described in more detail below, each of the clusters 312 can have an associated quality score (e.g., the cluster 312a has a quality score 316). The cluster generator 310 can assign a feature vector to each of the itineraries 307 (e.g., an itinerary 307a has a feature vector 318) and cluster the itineraries 307 based on the feature vectors.

In stage 4, a filter generator 320 generates one or more filters 322 using the clusters 312. In some implementations, the filter generator 320 generates the filters 322 from a subset of the clusters 312 that have the highest associated quality scores. For example, a filter can be generated for each of a specified number (e.g., five) of the highest-scoring clusters. In some implementations, the number of filters generated is based at least in part on whether the respective clusters have a quality score that exceeds a threshold value.

In stage 5, the user interface engine 302 provides the itineraries 307 that satisfy the flight search query 304 and the one or more filters 322 to the user device that submitted the flight search query for display. The filters 322 are configured for selection in response to a received input and therefore can be selected by the user, for example, to filter (e.g., view a subset of) the itineraries 307 on the user device.

Figure 4:
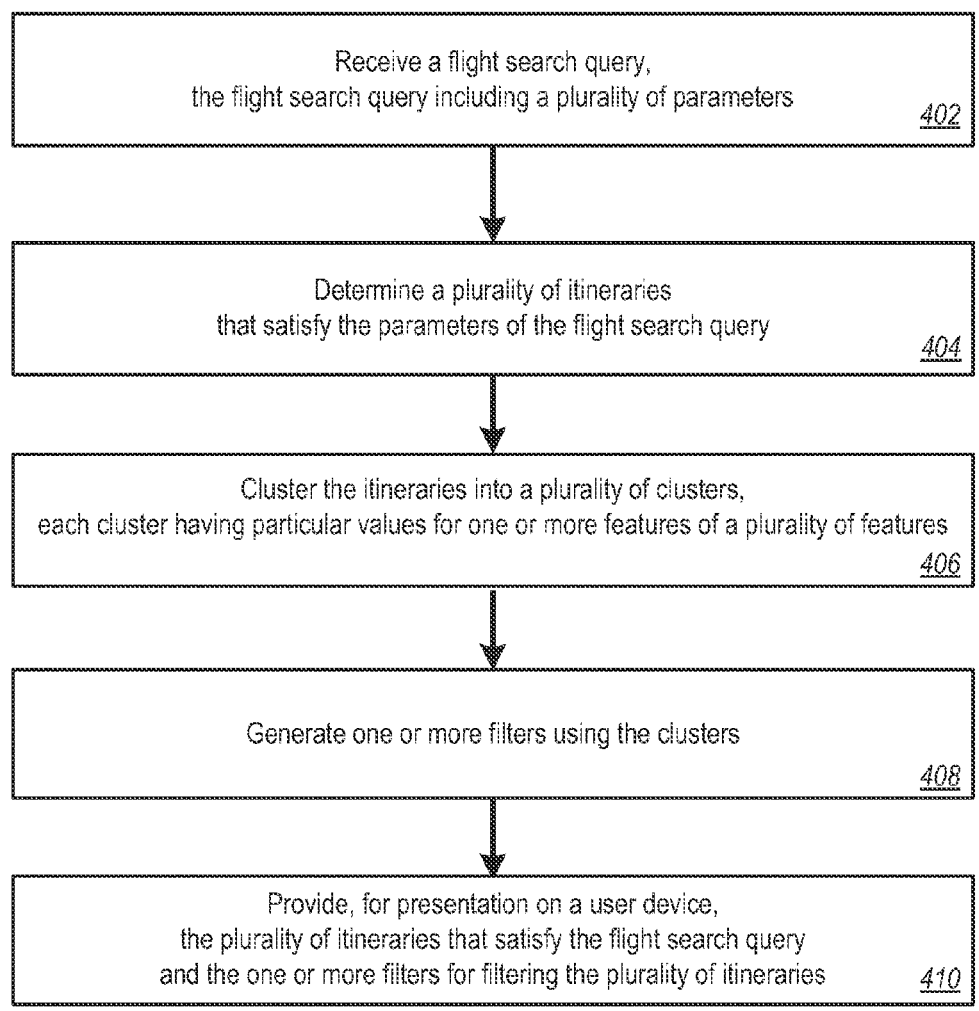
FIG. 4 is a flow diagram of an example method for providing filters for filtering flight itineraries.

The travel system 300 can include other components. For example, in some implementations, the travel system 300 can include a repository of cached common flight search queries and associated, pregenerated filters that can be retrieved when a cached, common flight search query is received. The repository can be updated periodically, such as once an hour or once per day. A list of the common flight search queries can be maintained based on ongoing analysis of received flight search queries FIG. 4 is flow diagram of an example method 400 for filtering flight itineraries. For convenience, the method 400 will be described with respect to a system, including one or more computing devices, that performs the method 400.

The system receives a flight search query including a plurality of parameters (step 402). For example, a flight search query can be received from a user device. The flight search query can include, for example, values for origin location, destination location, date, or other parameters The system determines a set of itineraries that satisfy the parameters of the flight search query (step 404). For example, a database and/or a data feed of current flight information can be queried to determine itineraries that satisfy the parameters of the flight search query.

The itineraries are clustered into a group of clusters (step 406), each cluster having particular values for one or more features of a collection of features. The one or more features can include predetermined features such as price, duration, number-of stops, airline, or departure time, for example. Clusters can be generated so that each itinerary is a member of at least one cluster.

In some implementations, a feature vector is determined for each itinerary. The feature vector can include, for an itinerary, an element for each feature in a set of features. The features in the set of features can include, for example, the predetermined features mentioned above and/or other features identified from the itineraries. In some implementations, a weight is assigned to each element in a feature vector to facilitate feature vector comparison. Weights for some features, such as price, duration, and number of stops, can be associated, for example, with a non-personalized best-flights model. Other features, which may be subjective (e.g., "is on Carrier A", or "departs before 9 am"), can be weighted so that they appear in a cluster when they are a feature that distinguishes a cluster from other clusters.

In some implementations, a quality score can be determined for and associated with each cluster. For example, a quality score of a cluster can represent a user's confidence in applying a filter associated with the cluster and understanding what itineraries are being excluded using the filter. For example a "costs less than $2000" cluster can have a higher quality score than a "costs less than $500" cluster, and similarly a "flight less than 12 hours" cluster can have a higher quality score than a "flight less than 9 hours" cluster. Clusters associated with features that do not have continuous values (e.g., "Carrier A", "is nonstop") can have a fixed, predetermined quality score. In some implementations, the quality of a cluster can be defined using formula (1):

$$\Sigma_{1 \leq i \leq t} \min_{s \in cluster}(f_i(s)) \qquad (1)$$

where $f_i$ ranges across all features in a feature vector associated with the cluster, s ranges across all itineraries in the cluster, $f_i(s)$ denotes the value of feature $f_i$ for itinerary s, and $\min_{s \in cluster}(f_i(S))$ is the least value of feature $f_i$ for any itinerary in the cluster. The least values are summed across all features $f_i$ in the feature vector to determine the quality score for the cluster.

As mentioned above, a cluster can have more than one feature. A high quality cluster can be a cluster that has at least one high-scoring feature for which every itinerary in the cluster scores highly. Accordingly, high-quality clusters can be described concisely and distinctively by using a description that indicates the high-scoring feature(s) and, if applicable, a threshold value associated with the feature (e.g., a high-scoring feature can be described as "flights costing at least $1000").

In some implementations, the system clusters the itineraries using a mixed-integer linear program solving process, with integer-valued variables representing cluster assignments. For example, suppose that there are t determined itineraries and a target number of n clusters. Accordingly, n×t integer variables can be included in a linear program, with an integer variable at a position of (i, s) having a value of one when an $s^{th}$ solution is in an $i^{th}$ cluster and having a value of zero when the $s^{th}$ solution is not in the $i^{th}$ cluster. The linear program solving process can be configured to determine a solution in which variable assignments maximize an overall quality score. In some implementations, the overall quality score for a solution is defined as the lowest-quality cluster in the solution.

In some other implementations, the overall quality score of a solution is the average (e.g., weighted mean) quality of the clusters in the solution, where the mean is weighted by the number of itineraries in each cluster. Determining an overall quality score within the solving process can include adding one or more real-valued variables to the linear program. The variable assignments that are output by the linear program solving process can be used for determining the clustering.

As another example, the system clusters the itineraries using hierarchical agglomerative clustering. The system can generate one cluster for each determined itinerary with each initial cluster including only the respective itinerary. The system can perform multiple combination steps, where at each step the system combines a pair of clusters chosen to maximize a quality score for that step. The quality score for a step can be defined, for a pair of clusters C and D that are combined into a cluster containing both C and D (e.g., a cluster CD), as quality(CD). As another example, the quality score for the step can be defined as quality(CD)-min(quality(C), quality(D)). The system can continue combining clusters (including combining aggregate clusters) until the number of remaining clusters is reduced to a specified number of clusters (e.g., five).

The system generates one or more filters using the clusters (step 408). Filters can be generated, for example, so that every determined itinerary is rejected by at least one filter. In some implementations, a filter may be generated for each cluster that has a quality score above a threshold. In some implementations, a filter may be generated for a predetermined number (e.g., five) of the clusters with the highest quality scores.

The system provides the plurality of itineraries that satisfy the flight search query and the one or more filters for presentation on a user device, for filtering the plurality of itineraries (step 410). For example, a user can select a presented filter to view a subset of itineraries that match the selected filter.

In some implementations, in response to receiving input from the user device indicating selection of one or more filters, the itineraries that satisfy the selected filters can be re-clustered, and a new set of filters can be generated and presented on the user device. Furthermore, selection of one of the new filters can result in further re-clustering and presentation of other filters, and so on.

In some implementations, offline analysis of generated clusters can be performed. For example, market characteristics of a particular type of flight (e.g., New York to Chicago) can be determined by determining the highest quality clusters for the market for various itineraries that are associated with the market. For example, the highest quality clusters can be determined for New York to Chicago flights for various times of day or days of week and a distribution of clusters and associated features can be determined. Other analysis for other markets can be performed, where a market can be defined as a set of itineraries that have one or more features (e.g., origin destination, location destination, carrier, departure time, or other feature) in common.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method to provide graphical user interfaces comprising filtered flight itineraries, comprising:
   receiving, by one or more computing devices, a flight search query, the flight search query comprising a plurality of parameters;
   determining, by the one or more computing devices, a plurality of itineraries that satisfy the parameters of the flight search query, wherein each itinerary comprises values of particular features;
   for each itinerary of the plurality of itineraries that satisfy the parameters of the flight search query:
      determining, by the one or more computing devices, a feature vector based on values of one or more features of the itinerary, and
      assigning, by the one or more computing devices, a weight for each of the one or more features of the feature vector;
   clustering, by the one or more computing devices and based on the feature vectors of the plurality of itineraries and the assigned weight for each of the one or more features in each of the feature vectors, the plurality of itineraries into a plurality of clusters, wherein each of the plurality of clusters is generated to have particular values for one or more of a plurality of features associated with the plurality of itineraries that satisfy the parameters of the flight search query;
   generating, by the one or more computing devices, one or more primary filters corresponding to one or more of the plurality of clusters, wherein each primary filter has the particular values of the one or more features identified by the corresponding cluster;
   transmitting, by the one or more computing devices and to a user computing device, instructions to display a graphical user interface comprising the plurality of itineraries that satisfy the flight search query and the one or more primary filters for filtering the plurality of itineraries;
   receiving, by the one or more computing devices and from the user computing device, an input from the user computing device indicating a selection of one or more primary filters in the graphical user interface; and
   in response to receiving the input from the user computing device indicating the selection of one or more primary filters in the graphical user interface:
      re-clustering, by the one or more computing devices, the itineraries of the plurality of itineraries that satisfy the selected one or more primary filters to generate one or more secondary filters, and
      transmitting, by the one or more computing devices to the user computing device, instructions to update the display of the graphical user interface to display the one or more secondary filters and itineraries that satisfy the selected one or more primary filters.

2. The method of claim 1, wherein each itinerary of the plurality of itineraries is a member of at least one cluster.

3. The method of claim 1, wherein each of the particular values of the one or more features of each cluster has an associated weight.

4. The method of claim 1, wherein each cluster comprises an associated quality score.

5. The method of claim 4, wherein generating the one or more primary filters using the clusters comprises selecting, by the one or more computing devices, one or more clusters having a highest associated quality score.

6. The method of claim 1, wherein the clustering comprises assigning, by the one or more computing devices, a feature vector to each itinerary and clustering based on the feature vectors.

7. The method of claim 1, wherein the flight search query comprises values for origin location, destination location, and date parameters.

8. The method of claim 1, wherein the one or more features comprise one or more of price, duration number-of stops, airline, or departure time.

9. The method of claim 1, further comprising:
in response to receiving the input of the selection of one or more primary filters in the graphical user interface,
re-clustering, by the one or more computing devices, the itineraries of the plurality of itineraries that satisfy the selected one or more primary filters.

10. A system to provide graphical user interfaces comprising filtered flight itineraries, comprising:
a storage device; and
one or more computers configured to execute application code instructions stored in the storage device to cause the system to:
receive a flight search query, the flight search query including a plurality of parameters;
determine a plurality of itineraries that satisfy the parameters of the flight search query, wherein each itinerary comprises values of particular features;
for each itinerary of the plurality of itineraries that satisfy the parameters of the flight search query:
determine a feature vector based on values of one or more features of the itinerary, and
assign a weight for each of the one or more features of the feature vector;
cluster, based on the feature vectors of the plurality of itineraries and the assigned weight for each of the one or more features in each of the feature vectors, the plurality of itineraries into a plurality of clusters, wherein each of the plurality of clusters is generated to have particular values for one or more of a plurality of features associated with the plurality of itineraries that satisfy the parameters of the flight search query;
generate one or more primary filters corresponding to one or more of the plurality of clusters, wherein each primary filter has the particular values of the one or more features identified by the corresponding cluster;
transmit, to a user computing device, instructions to display a graphical user interface via the user computing device comprising the plurality of itineraries that satisfy the flight search query and the one or more primary filters for filtering the plurality of itineraries;
receive, from the user computing device, an input from the user computing device indicating a selection of one or more primary filters in the graphical user interface; and
in response to receiving the input from the user computing device indicating the selection of one or more primary filters in the graphical user interface:
re-cluster the itineraries of the plurality of itineraries that satisfy the selected one or more primary filters to generate one or more secondary filters, and
transmit, to the user computing device, instructions to update the display of the graphical user interface to display the one or more secondary filters and itineraries that satisfy the selected one or more primary filters.

11. The system of claim 10, wherein each itinerary of the plurality of itineraries is a member of at least one cluster.

12. The system of claim 10, wherein each of the particular values of the one or more features of each cluster comprises an associated weight.

13. The system of claim 10, wherein each cluster comprises an associated quality score.

14. The system of claim 10, wherein generating the one or more primary filters using the clusters comprises selecting one or more clusters having a highest associated quality score.

15. The system of claim 10, wherein the clustering comprises assigning a feature vector to each itinerary and clustering based on the feature vectors.

16. A non-transitory computer-readable storage medium encoded with a computer program, comprising computer-executable instructions that when executed by one or more computers cause the one or more computers to provide graphical user interfaces comprising filtered flight itineraries, the computer-executable instructions comprising:
computer-executable instructions to receive a flight search query, the flight search query including a plurality of parameters;
computer-executable instructions to determine a plurality of itineraries that satisfy the parameters of the flight search query, wherein each itinerary comprises values of particular features;
for each itinerary of the plurality of itineraries that satisfy the parameters of the flight search query:
computer-executable instructions to determine a feature vector based on values of one or more features of the itinerary, and
computer-executable instructions to assign a weight for each of the one or more features of the feature vector;
computer-executable instructions to cluster, based on the feature vectors of the plurality of itineraries and the assigned weight for each of the one or more features in each of the feature vectors, the plurality of itineraries into a plurality of clusters, wherein each of the plurality of clusters is generated to have particular values for one or more of a plurality of features associated with the plurality of itineraries that satisfy the flight search query;
computer-executable instructions to generate one or more primary filters corresponding to one or more of the plurality of clusters, wherein each primary filter has the particular values of the one or more features identified by the corresponding cluster;
computer-executable instructions to transmit, to a user computing device, instructions to display a graphical interface via the user computing device comprising the plurality of itineraries that satisfy the flight search query and the one or more primary filters for filtering the plurality of itineraries;
computer-executable instructions to receive, from the user computing device, an input from the user computing device indicating a selection of one or more primary filters in the graphical user interface; and
in response to receiving the input from the user computing device indicating the selection of one or more primary filters in the graphical user interface:
computer-executable instructions to re-cluster the itineraries of the plurality of itineraries that satisfy the selected one or more primary filters to generate one or more secondary filters, and computer-executable instructions to transmit, to the user computing device, instructions to update the display of the graphical user interface to display the one or more secondary filters and itineraries that satisfy the selected one or more primary filters.

17. The non-transitory computer-readable storage medium of claim 16, wherein each itinerary of the plurality of itineraries is a member of at least one cluster.

18. The non-transitory computer-readable storage medium of claim 16, wherein each of the particular values of the one or more features of each cluster comprises an associated weight.

19. The non-transitory computer-readable storage medium of claim 16, wherein each cluster comprises an associated quality score.

20. The non-transitory computer-readable storage medium of claim 19, wherein generating the one or more primary filters comprises selecting one or more clusters having a highest associated quality score.

* * * * *